(12) United States Patent
Fan et al.

(10) Patent No.: US 12,063,075 B1
(45) Date of Patent: Aug. 13, 2024

(54) SIGNAL TRANSMISSION SYSTEM (71) Applicant: Shenzhen Zhiyong Electronics Co., Ltd., Shenzhen (CN)

(72) Inventors: Xiaoming Fan, Shenzhen (CN); Jiawei Fan, Shenzhen (CN)

(73) Assignee: SHENZHEN ZHIYONG ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 18/610,370

(22) Filed: Mar. 20, 2024

(30) Foreign Application Priority Data

Aug. 21, 2023 (CN) .......................... 202311050004.6

(51) Int. Cl.
H04B 10/80 (2013.01)
(52) U.S. Cl.
CPC ................... H04B 10/807 (2013.01)
(58) Field of Classification Search
CPC .... H04B 10/25; H04B 10/40; H04B 10/5057; H04B 10/5059; H04B 10/80; H04B 10/807
See application file for complete search history.

(56) References Cited

U.S. PATENT DOCUMENTS 8,078,053 B1* 12/2011 Mazzini ............. H04B 10/2581
398/28
2020/0076508 A1* 3/2020 Jia ..................... H04B 10/2589

FOREIGN PATENT DOCUMENTS

CN 116566494 A 8/2023

* cited by examiner

Primary Examiner — Kevin K Pyo
(74) Attorney, Agent, or Firm — IPRO, PLLC (57) ABSTRACT A signal transmission system includes a first laser signal transmission system, a second laser signal transmission system and a control module. The first laser signal transmission system includes an electric signal generation module, a first electro-optical conversion module and a first optical-electro conversion module. The electric signal generation module outputs a first current and a first voltage. The first electro-optical conversion module outputs a first optical signal. The first optical-electro conversion module outputs a second voltage. The second laser signal transmission system alternately inputs the first voltage and a calibration voltage and outputs a third voltage. The control module determines the first voltage based on the correspondence relationship between the calibration voltage and the third voltage and based on the third voltage, and determines a first electro-optical conversion coefficient based on a ratio of the first voltage to the second voltage.

7 Claims, 8 Drawing Sheets

```
┌─────────────────────────────────────────────────────────────────┐
│ Configuring the calibration voltage as a multilevel voltage signal, wherein the │─ 41
│ multilevel voltage signal is a voltage signal including at least two levels     │
└─────────────────────────────────────────────────────────────────┘
                                  │
┌─────────────────────────────────────────────────────────────────┐
│ Respectively substituting the voltage corresponding to each level in the multilevel │
│ voltage signal into a first formula when the calibration voltage is input to the first │─ 42
│ amplifier, so as to determine a second electro-optical conversion coefficient and │
│ a second threshold current of the second electro-optical conversion module,     │
│ wherein the first formula is V3=K2 (V4-V-)/R1-K2*Ith2                           │
└─────────────────────────────────────────────────────────────────┘
                                  │
┌─────────────────────────────────────────────────────────────────┐
│ Substituting the third voltage, the second electro-optical conversion coefficient │─ 43
│ and the second threshold current into the first formula to determine the first    │
│ voltage when the first voltage is input to the first amplifier                    │
└─────────────────────────────────────────────────────────────────┘
```

| Configuring the calibration voltage as a ramp voltage signal, wherein the ramp voltage signal is a signal of which the voltage changes with a preset slope | ─71 |

| When the calibration voltage is input to the first amplifier, reading the calibration voltage and the third voltage respectively at preset time intervals to determine the correspondence relationship between the calibration voltage and the third voltage at at least one moment | ─72 |

| When the first voltage is input to the first amplifier, determining the first voltage based on the third voltage and the correspondence relationship between the calibration voltage and the third voltage at the at least one moment | ─73 |

SIGNAL TRANSMISSION SYSTEM

TECHNICAL FIELD OF THE INVENTION

The present application relates to the technical field of signal transmission, and in particular, relates to a signal transmission system.

BACKGROUND OF THE INVENTION

At present, an optical fiber signal transmission system usually consists of three parts, namely a transmitter for converting electrical signals into optical signals, analog optical fiber for connecting the transmitter with a receiver to transmit the optical signals, and the receiver for converting the optical signals into electrical signals. Signal transmission using analog optical fiber features strong anti-interference performance and capability of withstanding extremely high voltage.

An electro-optical conversion module, such as a laser diode, is provided in the transmitter for converting electrical signals into optical signals. In the process of transmitting analog signals by the optical fiber, temperature drift occurs to the electro-optical conversion coefficient of the electro-optical conversion module, which will lead to poor transmission accuracy.

SUMMARY OF THE INVENTION

In the first aspect, the present application provides a signal transmission system, which includes.
- a first laser signal transmission system, a second laser signal transmission system and a control module;
- the first laser signal transmission system comprising an electric signal generation module, a first electro-optical conversion module and a first optical-electro conversion module;
- the electric signal generation module being connected with the first electro-optical conversion module and an input voltage respectively, and being configured to output a first current based on the input voltage and output a first voltage which is in direct proportion to the difference between the first current and a first threshold current of the first electro-optical conversion module, wherein when the current flowing through the first electro-optical conversion module is less than the first threshold current, the first electro-optical conversion module stops working;
- the first electro-optical conversion module being configured to output a first optical signal corresponding to the first current, wherein the first optical signal is transmitted through a first analog optical fiber;
- the first optical-electro conversion module being connected with the control module, and being configured to receive the first optical signal from the first analog optical fiber and output a second voltage to the control module based on the first optical signal;
- the second laser signal transmission system being connected with the control module and alternately inputting the first voltage and a preset calibration voltage, wherein the second laser signal transmission system is configured to output a third voltage proportional to the voltage input by the second laser signal transmission system to the control module;
- the control module being configured to determine the first voltage based on the correspondence relationship between the calibration voltage and the third voltage and based on the third voltage, and determine a first electro-optical conversion coefficient of the first electro-optical conversion module based on a ratio of the first voltage to the second voltage.

Optionally, the second laser signal transmission system includes a switch module, a voltage-current conversion module, a second electro-optical conversion module and a second optical-electro conversion module;
- the control module further being configured to output the calibration voltage and output a pulse signal;
- the switch module being respectively connected with the electric signal generation module, the control module and the voltage-current conversion module, and being configured to receive the pulse signal, establish a connection between the electric signal generation module and the voltage-current conversion module when the pulse signal is at a first level so as to input the first voltage to the voltage-current conversion module, and establish a connection between the control module and the voltage-current conversion module when the pulse signal is at a second level so as to input the calibration voltage to the voltage-current conversion module;
- the voltage-current conversion module being configured to output a second current based on the first voltage or the calibration voltage;
- the second electro-optical conversion module being connected with the voltage-current conversion module, an being configured to output a second optical signal corresponding to the second current, wherein the second optical signal is transmitted through a second analog optical fiber;
- the second optical-electro conversion module being connected with the control module, and being configured to receive the second optical signal from the second analog optical fiber and output the third voltage based on the second optical signal.

Optionally, the voltage-current conversion module includes a first amplifier, a first power triode and a first resistor;
- a first input end of the first amplifier being connected with the switch module, a second input end of the first amplifier being respectively connected with a first end of the first resistor and an emitter of the first power triode, a collector of the first power triode being connected with the second electro-optical conversion module, an output end of the first amplifier being connected with a base of the first power triode, and a second end of the first resistor being connected with a negative power supply:

Optionally, the control module is further configured to:
- configure the calibration voltage as a multilevel voltage signal, wherein the multilevel voltage signal is a voltage signal including at least two levels;
- when the calibration voltage is input to the first amplifier, respectively substitute the voltage corresponding to each level in the multilevel voltage signal into a first formula to determine a second electro-optical conversion coefficient and a second threshold current of the second electro-optical conversion module, wherein the first formula is $V3=K2(V4-V-)/R1-K2*Ith2$, $V3$ is the third voltage, $K2$ is the second electro-optical conversion coefficient, $V4$ is a voltage input by the first input end of the first amplifier, $V-$ is the voltage of the negative power supply, $R1$ is the resistance of the first resistor, $Ith2$ is the second threshold current of the second electro-optical conversion module, and when the current flowing through the second electro-optical conversion module is less than the second threshold current, the second electro-optical conversion module stops working;

when the first voltage is input to the first amplifier, substitute the third voltage, the second electro-optical conversion coefficient and the second threshold current into the first formula to determine the first voltage.

Optionally, the control module is further configured to:

configure the calibration voltage as a ramp voltage signal, wherein the ramp voltage signal is a signal of which the voltage changes with a preset slope;

when the calibration voltage is input to the first amplifier, read the calibration voltage and the third voltage respectively at preset time intervals so as to determine the correspondence relationship between the calibration voltage and the third voltage at at least one moment;

when the first voltage is input to the first amplifier, determine the first voltage based on the third voltage and the correspondence relationship between the calibration voltage and the third voltage at the at least one moment.

Optionally, the first optical-electro conversion module includes a first photodiode and a second amplifier;

the first photodiode is configured to receive the first optical signal from the first analog optical fiber and convert the first optical signal into a fourth voltage;

the second amplifier is connected with the first photodiode, and is configured to amplify the fourth voltage and output the second voltage;

the control module is further configured to adjust a amplification factor of the second amplifier based on a first ratio of the first voltage to the second voltage.

Optionally, the electric signal generation module includes a third amplifier, a second power triode, a second resistor, a first subtracter and a second subtracter;

a first input end of the third amplifier is connected with the input voltage, a second input end of the third amplifier is connected with an emitter of the second power triode, a first end of the second resistor and a first input end of the first subtracter, an output end of the third amplifier is connected with a base of the second power triode, a collector of the second power triode is connected with a first end of the first electro-optical conversion module, a second end of the first electro-optical conversion module is connected with a positive voltage source, a second end of the second resistor is connected with a negative voltage source and a second input end of the first subtracter respectively, an output end of the first subtracter is connected with a first input end of the second subtracter, a second input end of the second subtracter inputs a reference voltage, and an output end of the second subtracter outputs the first voltage, wherein the reference voltage is obtained through multiplying the first threshold current by the resistance of the second resistor;

the third amplifier is configured to amplify the input voltage and then input the input voltage amplified to the second power triode so that the second power triode is turned on to generate the first current.

Optionally, the resistance of the second resistor is configured to be equal to a reference electro-optical conversion coefficient of the first electro-optical conversion module;

the control module is further configured to:

determine a first reference ratio of the first voltage to the second voltage to be 1;

keep the amplification factor of the second amplifier unchanged if the first reference ratio is equal to the first ratio;

decrease the amplification factor of the second amplifier if the first reference ratio is greater than the first ratio; and increase the amplification factor of the second amplifier if the first reference ratio is smaller than the first ratio.

Optionally, the first optical-electro conversion module includes a first laser diode, and the second optical-electro conversion module includes a second laser diode;

a first end of the first laser diode is connected with a positive power supply, a second end of the first laser diode is connected with the electric signal generation module;

a first end of the second laser diode is connected with the positive power supply, and a second end of the second laser diode is connected with the voltage-current conversion module.

Optionally, the second optical-electro conversion module includes a second photodiode and a fourth amplifier;

the second photodiode is configured to receive the second optical signal from the second analog optical fiber and convert the second optical signal into a fifth voltage;

an input end of the fourth amplifier is connected with the second photodiode, an output end of the fourth amplifier is connected with the control module, and the fourth amplifier is configured to amplify the fifth voltage and output the third voltage.

Optionally, the signal transmission system further includes a subtracter, and the subtracter is respectively connected with the first optical-electro conversion module and the control module;

the control module is further configured to acquire a first static working current of the first electro-optical conversion module and output a sixth voltage corresponding to the first static working current to the subtracter, wherein the current flowing through the first electro-optical conversion module when the input voltage is 0 is the first static working current; and the subtracter is configured to generate an output voltage based on the difference between the second voltage and the sixth voltage.

Beneficial effects of the present application are as follows: the signal transmission system provided according to the present application includes a first laser signal transmission system, a second laser signal transmission system and a control module. The first laser signal transmission system includes an electric signal generation module, a first electro-optical conversion module and a first optical-electro conversion module. The electric signal generation module is respectively connected with the first electro-optical conversion module and the input voltage. The electric signal generation module is configured to output a first current based on the input voltage and output a first voltage in direct proportion to the difference between the first current and the first threshold current of the first electro-optical conversion module. When the current flowing through the first electro-optical conversion module is less than the first threshold current, the first electro-optical conversion module stops working. The first electro-optical conversion module is configured to output a first optical signal corresponding to the first current. The first optical signal is transmitted through a first analog optical fiber. The first optical-electro conversion module is configured to receive the first optical signal from the first analog optical fiber and output a second voltage based on the first optical signal. The second laser signal transmission system is connected with the control module, the second laser signal transmission system alternately inputs the first voltage and the preset calibration voltage, and the second laser signal transmission system is configured to output a third voltage proportional to the voltage input by the second laser signal transmission system to the control module. The control module is configured to determine the first voltage based on the correspondence relationship between the calibration voltage and the third voltage and based on the third voltage, and determine the first electro-optical conversion coefficient of the first electro-optical conversion module based on the ratio of the first voltage to the second voltage. Through the above method, the first electro-optical conversion coefficient of the first electro-optical conversion module can be determined in real time. Then, the change of the first electro-optical conversion coefficient can be compensated when the first electro-optical conversion coefficient changes due to temperature drift, which is beneficial to improving transmission accuracy.

BRIEF DESCRIPTION OF DRAWINGS

One or more embodiments are exemplarily described with reference to pictures in corresponding attached drawings, and these exemplary descriptions are not intended to limit the embodiments. In the attached drawings, elements with the same reference numerals represent the same or similar elements, and unless otherwise stated, the pictures in the attached drawings are not intended to limit the scale.

DETAILED DESCRIPTION OF THE INVENTION

To make the objectives, technical solutions and advantages of embodiments of the present application more apparent, the technical solutions of the embodiments of this application will be described clearly and completely with reference to the attached drawings illustrating the embodiments of this application. Obviously, the embodiments described herein are only a part of but not all of the embodiments of this application. All other embodiments that can be obtained by those of ordinary skill in the art from the embodiments of this application without making creative efforts shall fall within the scope claimed in this application.

Figure 1:
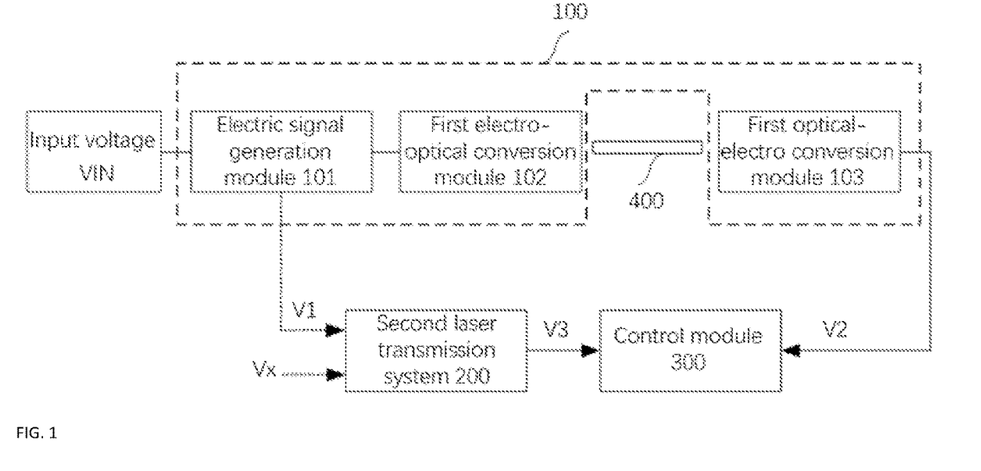
FIG. 1 is a schematic structural diagram of a signal transmission system according to a first embodiment of the present application.

Referring to FIG. 1, there is shown a schematic structural diagram of a signal transmission system provided according to an embodiment of the present application. As shown in FIG. 1, the signal transmission system includes a first laser signal transmission system 100, a second laser signal transmission system 200 and a control module 300.

The first laser signal transmission system 100 includes an electric signal generation module 101, a first electro-optical conversion module 102 and a first electro-optical conversion module 103.

The electric signal generation module 101 is connected with the first electro-optical conversion module 102 and an input voltage VIN, respectively. The first optical-electro conversion module 103 is connected with the control module 300. Specifically, a first end of the electric signal generation module 101 is connected to the input voltage VIN, a second end of the electric signal generation module 101 is connected to the first optical-electro conversion module 102, and the first optical-electro conversion module 103 is connected to a first end of the control module 300. The second laser signal transmission system 200 is connected to a second end of the control module 300.

In this embodiment, the electric signal generation module 101 outputs a first current (denoted as a first current ILD1) based on the input voltage VIN. In some embodiments, the electric signal generation module 101 can specifically realize the linear conversion of the input voltage VIN into the first current ILD1, thus realizing a voltage-controlled current source. The first current is input to the first electro-optical conversion module 102. The electro-optical conversion module 102 outputs a first optical signal corresponding to the first current. What does the first optical signal corresponding to the first current mean is that the first optical signal is in proportion, e.g., in direct proportion, to the first current ILD1. Next, the first optical signal is transmitted through the first analog optical fiber 400. The first optical-electro conversion module 103 receives the first optical signal from the first analog optical fiber 400, and outputs a second voltage (denoted as a second voltage V2) to the control module 300 based on the first optical signal.

Meanwhile, the electric signal generation module 101 further outputs a first voltage (denoted as a first voltage V1) which is in direct proportion to the difference between the first current ILD1 and a first threshold current (denoted as a first threshold current Ith1) of the first electro-optical conversion module 102. That is, V1 is in direct proportion to (ILD1-Ith1). When the current flowing through the first electro-optical conversion module 102 is less than the first threshold current Ith1, the first electro-optical conversion module 102 stops working. In other words, the first threshold current Ith is the minimum working current of the first electro-optical conversion module 102, and the first electro-optical conversion module 102 outputs the first optical signal only when the current flowing through the first electro-optical conversion module 102 is greater than or equal to the first threshold current Ith.

Next, the first voltage V1 and a preset calibration voltage Vx are alternately input to the second laser signal transmission system 200. Then, the second laser signal transmission system 200 outputs a third voltage V3 proportional to the voltage input by the second laser signal transmission system 200 to the control module 300. That is, when the first voltage V1 is input to the second laser signal transmission system 200, the third voltage V3 output by the second laser signal transmission system 200 is in proportion, e.g., in direct proportion, to the first voltage V1. When the calibration voltage Vx is input to the second laser signal transmission system 200, the third voltage V3 output by the second laser signal transmission system 200 is proportional to the calibration voltage Vx.

When the calibration voltage Vx is input to the second laser signal transmission system 200, the control module 200 can determine the correspondence relationship between the calibration voltage Vx and the third voltage V3 based on the received third voltage V1. Since the calibration voltage Vx and the first voltage V1 are alternately input to the second laser signal transmission system 200, various parameters in the second laser signal transmission system 200, such as the electro-optical conversion coefficient, remain unchanged when it is switched from the calibration voltage Vx to the first voltage V1. Therefore, when the first voltage V1 is input to the second laser signal transmission system 200, it can be determined that the correspondence relationship between the first voltage V1 and the third voltage V3 is right the correspondence relationship between the calibration voltage Vx and the third voltage V3. Then, the control module 300 can determine the first voltage V1 in turn from the acquired third voltage V3 based on the correspondence relationship between the calibration voltage Vx and the third voltage V3 that has been known.

After determining the first voltage V1, the control module 300 can determine a first electro-optical conversion coefficient (denoted as a first electro-optical conversion coefficient K1) of the first electro-optical conversion module 102 based on the ratio of the first voltage V1 to the second voltage V2. In the first laser signal transmission system 100, the first optical signal is proportional to the first current ILD1 and the second voltage V2 respectively, so the first current ILD1 is also proportional to the second voltage V2. Furthermore, since the first threshold current Ith1 of the first electro-optical conversion module 102 exits constantly, it can be learned that the second voltage V2 is proportional to the difference between the first current ILD1 and the threshold current Ith1. That is, V2 is proportional to (ILD1-Ith). Because this proportional relationship is related to the first optical signal, it must be related to the first electro-optical conversion coefficient K1. Then, the correspondence relationship between the ratio of the first voltage V1 to the second voltage V2 and the first electro-optical conversion coefficient K1 can be obtained in combination with the fact that V1 is in direct proportion to (ILD1-Ith1). Then, when the first electro-optical conversion coefficient K1 changes due to temperature drift, the change of the first electro-optical conversion coefficient K1 can be determined through the ratio of the first voltage V1 to the second voltage V2, so that the change of the first electro-optical conversion coefficient K1 can be compensated, which is beneficial to improving the transmission accuracy.

In some embodiments, the control module 300 may be a general processor, a digital signal processor (DSP), an application specific integrated circuit (ASIC), a field programmable gate array (FPGA), a single chip microcomputer, an Acorn RISC Machine (ARM) or other programmable logic devices, discrete gates or transistor logics, discrete hardware components or any combination of these components. Furthermore, the control module 300 may be any of traditional processors, controllers, microcontrollers or state machines. The control module 300 may also be implemented as a combination of computing devices, for example, a combination of a DSP and a microprocessor, a plurality of microprocessors, one or more microprocessors in combination with a DSP, and/or any other such configuration.

Figure 2:
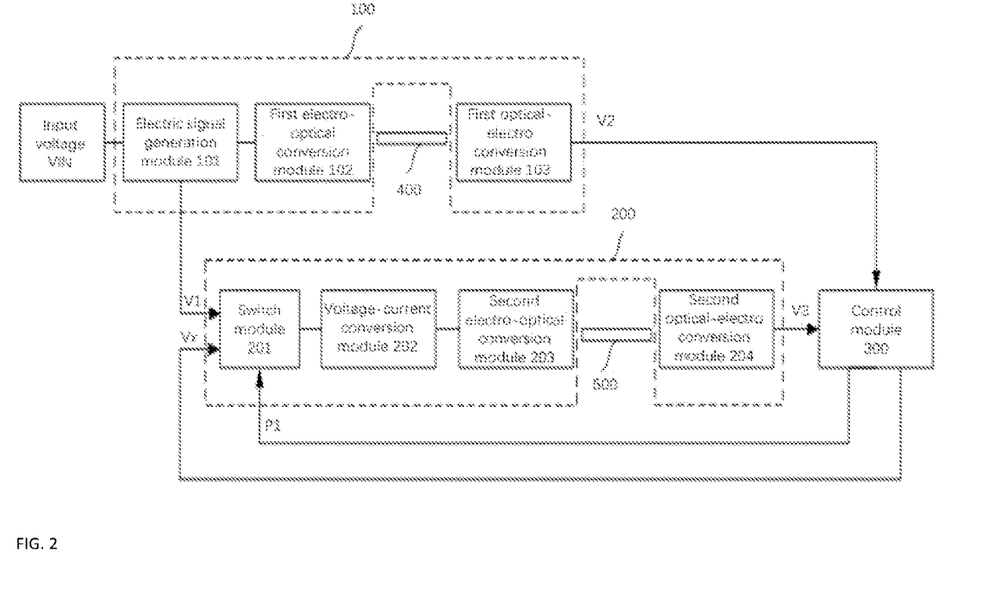
FIG. 2 is a schematic structural diagram of a signal transmission system according to a second embodiment of the present application.

In one embodiment, as shown in FIG. 2, the second laser signal transmission system 200 includes a switch module 201, a voltage-current conversion module 202, a second electro-optical conversion module 203 and a second optical-electro conversion module 204.

The switch module 201 is connected with the electric signal generation module 101, the control module 300 and the voltage-current conversion module 202 respectively. The second electro-optical conversion module 203 is connected with the voltage-current conversion module 202. Specifically, a first end of the switch module 201 is connected with the electric signal generation module 101, a second end of the switch module 201 is connected with a first end of the voltage-current conversion module 202, a third end of the switch module 201 is connected with a third end of the control module 300, and a fourth end of the switch module 201 is connected with a fourth end of the control module 300. A second end of the voltage-current conversion module 202 is connected with the second electro-optical conversion module 204. The second optical-electro conversion module 204 is connected to a second end of the control module 300.

Specifically, the control module 300 is further configured to output the calibration voltage Vx and output the pulse signal P1. The switch module 201 receives the pulse signal P1. Then, when the pulse signal P1 is at a first level (e.g., a high level), the switch module 201 establishes the connection between the electric signal generation module 101 and the voltage-current conversion module 202 to input the first voltage V1 to the voltage-current conversion module 202, so that the voltage-current conversion module 202 outputs the second current ILD2 based on the first voltage V1. The voltage-current conversion module 202 can realize the linear conversion of the input voltage VIN into the second current ILD2, thus realizing a voltage-controlled current source.

When the pulse signal P1 is at a second level (for example, the second level is a low level when the first level is a high level), the switch module 201 establishes the connection between the control module 300 and the voltage-current conversion module 202 to input the calibration voltage Vx to the voltage-current conversion module 202, so that the voltage-current conversion module 202 outputs a second current ILD2 based on the calibration voltage Vx.

Next, the second current ILD2 is input to the second electro-optical conversion module 203. The second electro-optical conversion module 203 outputs a second optical signal corresponding to the second current ILD2. What does the second optical signal corresponding to the second current ILD2 mean is that the second optical signal is in proportion, e.g., in direct proportion, to the second current ILD2. The second optical signal is transmitted through the second analog optical fiber 500. The second optical-electro conversion module 204 receives a second optical signal from the second analog optical fiber 500 and outputs the third voltage V3 to the control module 300 based on the second optical signal.

In this embodiment, since the calibration voltage Vx and the first voltage V1 are alternately input to the voltage-current conversion module 202 through the switch module 201 and finally converted into the third voltage V3 to be input to the control module 300, various parameters in the second laser signal transmission system 200 (such as the second electro-optical conversion coefficient K2 of the second electro-optical conversion module 203) remain unchanged when it is switched from the calibration voltage Vx to the first voltage V1 due to closeness in time. In some embodiments, the frequency of the pulse signal P1 may be set to 10 Hz-1000 HZ so that the second electro-optical conversion coefficient K2 remains unchanged when it is switched from the calibration voltage Vx to the first voltage V1, which is beneficial to obtaining the accurate first voltage V1 subsequently. Furthermore, when the first voltage V1 is input to the second laser signal transmission system 200, it can be determined that the correspondence relationship between the first voltage V1 and the third voltage V3 is right the correspondence relationship between the calibration voltage Vx and the third voltage V3. Then, the control module 300 can determine the first voltage V1 in turn from the acquired third voltage V3 based on the correspondence relationship between the calibration voltage Vx and the third voltage V3 that has been known. After determining the first voltage V1, the control module 300 can determine the first electro-optical conversion coefficient K1 based on the ratio of the first voltage V1 to the second voltage V2. Therefore, when the first electro-optical conversion coefficient K1 changes due to temperature drift, the change of the first electro-optical conversion coefficient K1 can be determined through the ratio of the first voltage V1 to the second voltage V2, so that the change of the first electro-optical conversion coefficient K1 can be compensated, which is beneficial to improving the transmission accuracy.

Figure 3:
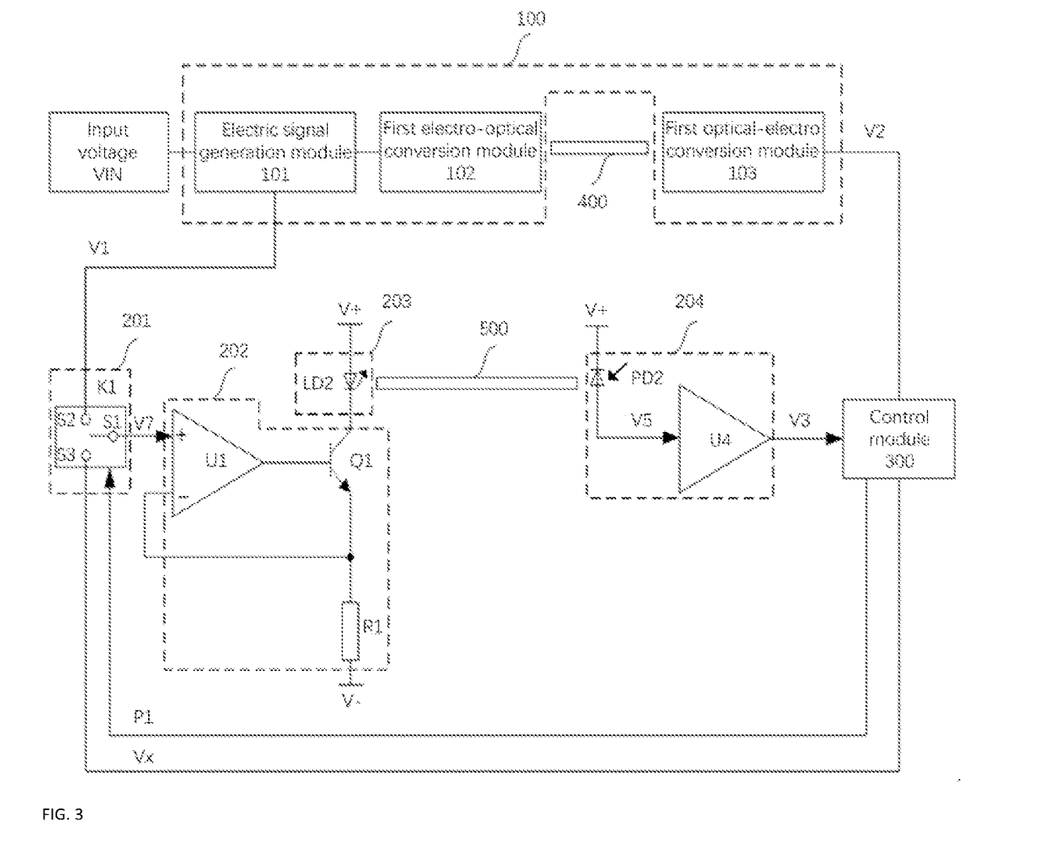
FIG. 3 is a schematic view illustrating the circuit structure of the signal transmission system according to the first embodiment of the present application.

Referring to FIG. 3, there is exemplarily shown a circuit structure of the second laser signal transmission system 200.

In an embodiment, as shown in FIG. 3, the switch module 201 includes a switch K1. A first end S1 of the switch K1 is connected with the voltage-current conversion module 202, a second end S2 of the switch K1 is connected with the electric signal generation module 101, a third end S3 of the switch K1 is connected with the control module 300, and the switch K1 is controlled by the pulse signal P1 output by the control module 300.

Specifically, when the pulse signal P1 is at the first level, the first end S1 of the switch K1 is connected with the second end S2 thereof to input the first voltage V1 to the voltage-current conversion module 202. When the pulse signal P1 is at the second level, the first end S1 of the switch K1 is connected with the third end S3 thereof to input the calibration voltage Vx to the voltage-current conversion module 202.

In an embodiment, the voltage-current conversion module 202 includes a first amplifier U1, a first power triode Q1 and a first resistor R1.

A first input end of the first amplifier U1 is connected with the switch module 201, a second input end of the first amplifier U1 is connected with a first end of the first resistor R1 and an emitter of the first power triode Q1, a collector of the first power triode Q1 is connected with the second electro-optical conversion module 203, an output end of the first amplifier U1 is connected with a base of the first power triode Q1, and a second end of the first resistor R1 is connected with the negative power supply V−. As an example, the first input end of the first amplifier U1 is a noninverting input end, and the second input end of the first amplifier U1 is an inverting input end.

Specifically, the first amplifier U1 is configured to amplify the voltage (i.e., the first voltage V1 or the reference voltage Vx) input thereto and input the amplified voltage to the first power triode Q1, so that the first power triode Q1 is turned on to generate the second current ILD2.

In an embodiment, the second optical-electro conversion module 203 includes a second laser diode LD2. A first end of the second laser diode LD2 is connected to the positive power supply V+, and a second end of the second laser diode LD2 is connected to the voltage-current conversion module 202.

Specifically, the second laser diode LD2 is a semiconductor laser, which is also called a Laser Diode (LD). The second laser diode LD2 uses semiconductor materials to generate and amplify laser beams. The working principle of the second laser diode LD2 is to inject current into the semiconductor material to generate stimulated radiation and amplify it into laser (i.e. output a second optical signal).

In an embodiment, the second optical-electro conversion module 204 includes a second photodiode PD2 and a fourth amplifier U4. An input end of the fourth amplifier U4 is connected with the second photodiode PD2, and an output end of the fourth amplifier U4 is connected with the control module 300.

Specifically, the second photodiode PD2 is configured to receive the second optical signal from the second analog optical fiber 500 and convert the second optical signal into a fifth voltage V5. The fourth amplifier U4 is configured to amplify the fifth voltage V5 and output the third voltage V3.

Figure 4:
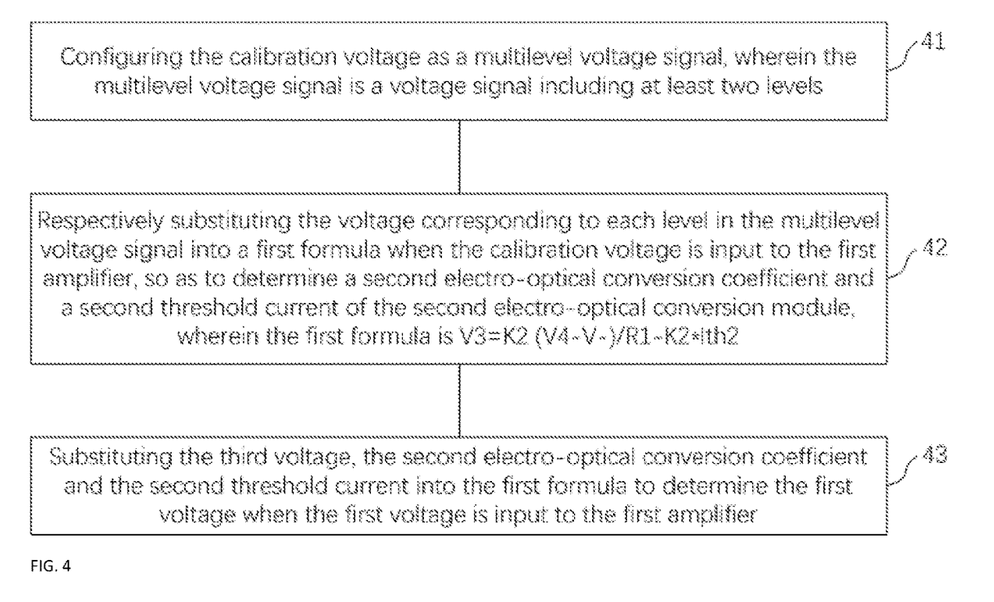
FIG. 4 is a schematic view illustrating steps of a method executed by a control module according to the first embodiment of the present application.

Based on the structure shown in FIG. 3, the present application further provides a method for determining the first voltage. The specific implementation process is shown in FIG. 4, and the control module 300 is further configured to realize the following steps of the method:

Step 41: configuring the calibration voltage as a multilevel voltage signal, wherein the multilevel voltage signal is a voltage signal including at least two levels;

Step 42: respectively substituting the voltage corresponding to each level in the multilevel voltage signal into a first formula when the calibration voltage is input to the first amplifier, so as to determine a second electro-optical conversion coefficient and a second threshold current of the second electro-optical conversion module, wherein the first formula is $V3=K2(V4-V-)/R1-K2*Ith2$;

wherein V3 is the third voltage, K2 is the second electro-optical conversion coefficient, V4 is a voltage input by the first input end of the first amplifier, V− is the voltage of the negative power supply, R1 is the resistance of the first resistor, Ith2 is the second threshold current of the second electro-optical conversion module 203. When the current flowing through the second electro-optical conversion module 203 is less than the second threshold current Ith2, the second electro-optical conversion module 203 stops working;

Step 43: substituting the third voltage, the second electro-optical conversion coefficient and the second threshold current into the first formula to determine the first voltage when the first voltage is input to the first amplifier.

The following description takes the case where the multilevel voltage signal is a voltage signal including two levels as an example.

Figure 5:
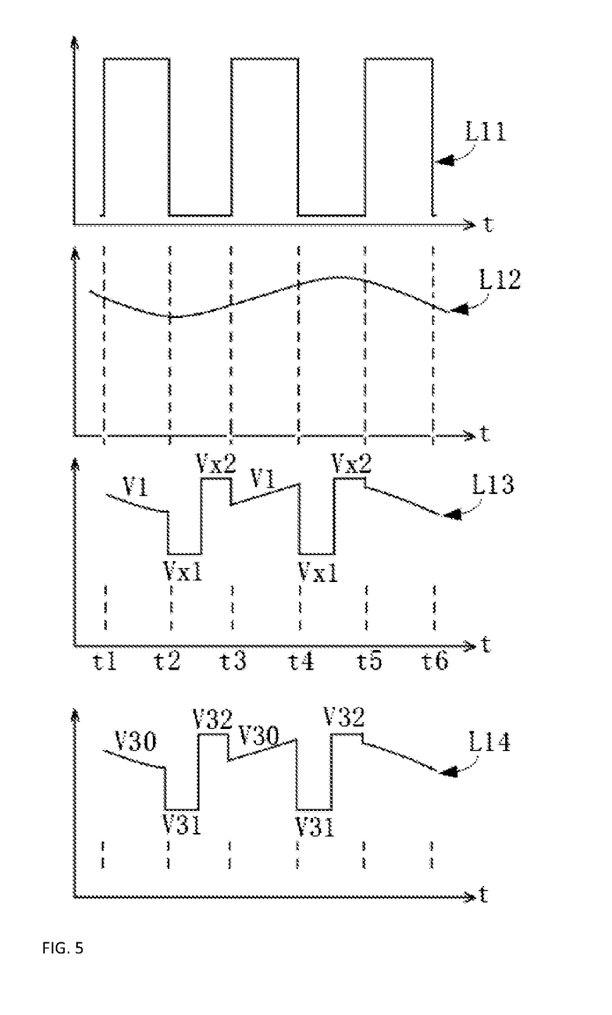
FIG. 5 is a schematic view of signals in the structure shown in FIG. 3 according to the first embodiment of the present application.

As shown in FIG. 5, the abscissa represents time. The curve L11 represents the pulse signal P1 (the frequency and duty ratio of the pulse signal P1 may be set depending on actual applications, and no specific limitation is made thereto by the embodiments of the present application); the curve L12 represents the first voltage V1; the curve L13 represents the voltage (denoted as a voltage V7) input to the noninverting input end of the first amplifier U1, wherein the first voltage V1 and the calibration voltage Vx are signals alternately input to the noninverting input end of the first amplifier U1; and the curve L14 represents the third voltage V3. The calibration voltage Vx includes a first level Vx1 and a second level Vx2.

Specifically, at time t1, since the pulse signal P1 is at the first level (which is exemplified as a high level in this embodiment), the first voltage V1 is input to the noninverting input end of the first amplifier U1 to obtain the third voltage V3. In order to better distinguish the magnitude of the third voltages V3 obtained at different times (that is, to distinguish different third voltages obtained by different inputs), the third voltage V3 at this time is denoted as a first third voltage V30. The first third voltage V30 is proportional to the first voltage V1.

Up to time t2, it is switched to input the calibration voltage Vx to the noninverting input end of the first amplifier U1. At this time, based on the first level Vx1 and the second level Vx2, two different third voltages, namely a second third voltage V31 and a third voltage V32, can be obtained respectively. The second third voltage V31 is proportional to the voltage corresponding to the first level Vx1, and the third voltage V32 is proportional to the second level Vx2. In addition, the above three proportional relationships (including the first third voltage V30 being proportional to the first voltage V1, the second third voltage V31 being proportional to the voltage corresponding to the first level Vx1, and the third voltage V32 being proportional to the second level Vx2) are the same.

Up to time t3, it is switched again to input the first voltage V1 to the noninverting input end of the first amplifier U1. The above process is repeated constantly in the above manner.

Figure 6:
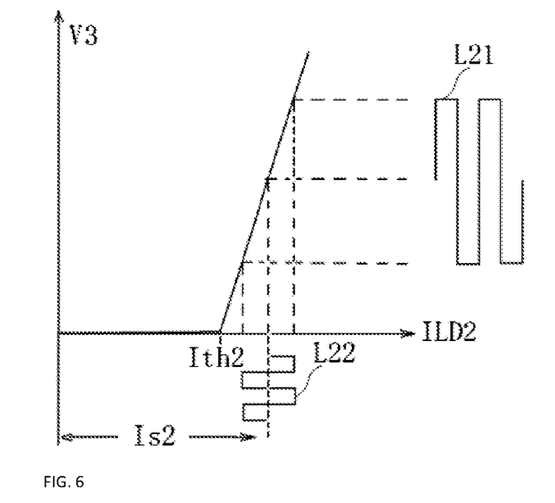
FIG. 6 is a schematic view of the second current and the third voltage according to the first embodiment of the present application.

Referring to FIG. 6 together, the abscissa represents the second current ILD2; and the ordinate represents the third voltage V3.

Before the second current ILD2 is increased to be equal to the second threshold current Ith2, the second electro-optical conversion module 203 does not output the second optical signal, in which case the third voltage V3 remains at 0. After the second current ILD2 is increased to be greater than the second threshold current Ith2, the third voltage V3 increases accordingly as the second current ILD2 increases. Moreover, the second current ILD2 is in direct proportion to the third voltage V3. For example, if the waveform of the second current ILD2 is as shown in the curve L21, then the waveform of the third voltage V3 is as shown in the curve 22. As can be seen, the waveform of the second current ILD2 is in direct proportion to the waveform of the third voltage V3, and the ratio of the second current ILD2 to the third voltage V3 is the second electro-optical conversion coefficient K2 of the second electro-optical conversion module 203. According to the above description, $V3=K2 (ILD2-Ith2)$ (1).

Meanwhile, in this embodiment, based on the imaginary short circuit and imaginary open circuit characteristics of the first amplifier U1, the voltages at the two input ends of the first amplifier U1 will eventually be equal. Therefore, the voltage V7 is equal to the voltage at the first end of the first resistor R1. The voltage at the second end of the first resistor R1 is the voltage provided by the negative power supply V−. Then, the second current $ILD2=(VIN-V-)/R1$ (2). In combination with the formula (1) with the formula (2), the following formula can be obtained: $V3=K2 (V4-V-)/R1-K2*Ith2$ (3). In addition, Formula (3) not only indicates the correspondence relationship between the calibration voltage Vx and the third voltage V3, but also indicates the correspondence relationship between the first voltage V1 and the third voltage V3.

Next, when the voltage V7 is the calibration signal Vx, the first level Vx1 and the second level Vx2 are sequentially substituted into the formula (3) so that the following formulas can be obtained: $V31=K2 (Vx1-V-)/R1-K2*Ith2$ (4) and $V32=K2 (Vx2-V-)/R1-K2*Ith2$ (5). K2 and Ith2 can be determined in combination with the formulas (4) and (5).

When the voltage V7 is the first voltage V1, the following formula can be obtained by substituting the first voltage V1 into the formula (3): $V3=K2 (V1-V-)/R1-K2*Ith2$ (6). In the formula (6), all of V3, K2, Ith2, R1 and V− are already known, so that the first voltage V1 can be calculated.

Figure 7:
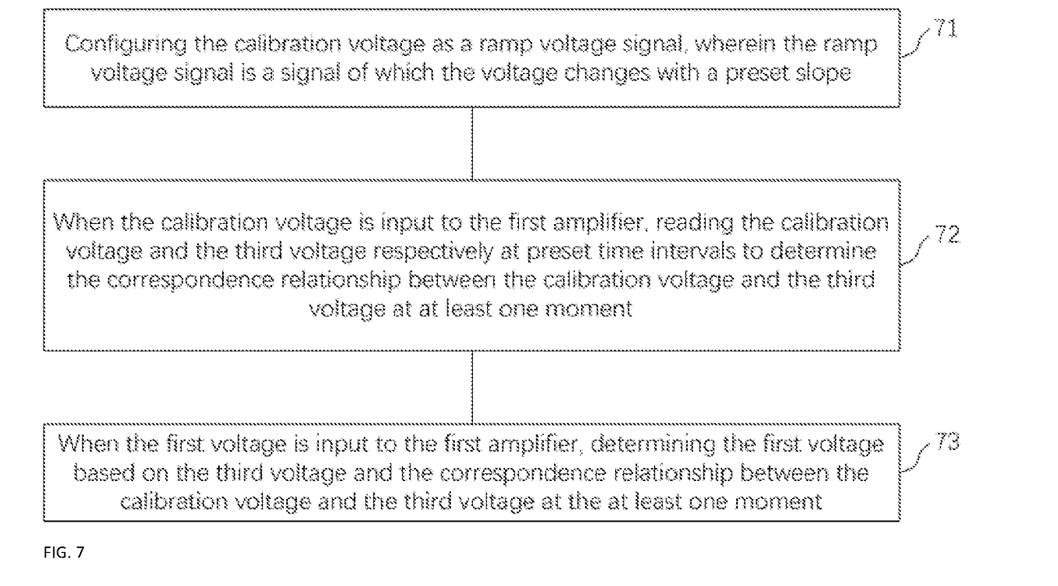
FIG. 7 is a schematic view illustrating steps of a method executed by a control module according to the second embodiment of the present application.

Based on the structure shown in FIG. 3, the present application further provides another method for determining the first voltage V1. The specific implementation process is shown in FIG. 7, and the control module 300 is further configured to implement the following steps of the method:

Step 71: configuring the calibration voltage as a ramp voltage signal, wherein the ramp voltage signal is a signal of which the voltage changes with a preset slope;

Step 72: when the calibration voltage is input to the first amplifier, reading the calibration voltage and the third voltage respectively at preset time intervals to determine the correspondence relationship between the calibration voltage and the third voltage at least one moment;

Step 73: when the first voltage is input to the first amplifier, determining the first voltage based on the third voltage and the correspondence relationship between the calibration voltage and the third voltage at the at least one moment.

Figure 8:
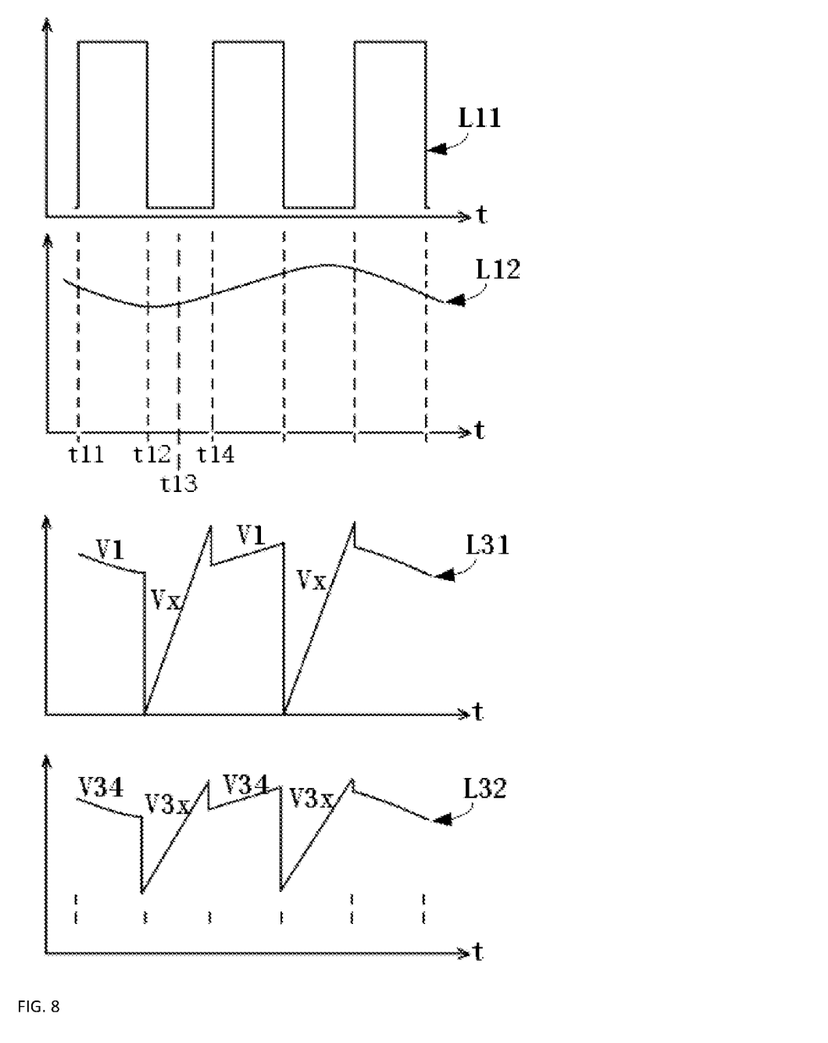
FIG. 8 is a schematic view of signals in the structure shown in FIG. 3 according to the second embodiment of the present application.

Referring to FIG. 8 together, FIG. 8 is a schematic view exemplarily showing signals in the structure shown in FIG. 3. As shown in FIG. 8, the abscissa represents time. The curve L11 represents the pulse signal P1; the curve L12 represents the first voltage V1; the curve L31 represents the voltage V7, the voltage V7 is the first voltage V1 and the calibration voltage Vx; and the curve 32 represents the third voltage V3. The calibration voltage Vx is a ramp voltage signal.

Specifically, at time t11, since the pulse signal P1 is at the first level (which is exemplified as a high level in this embodiment), the first voltage V1 is input to the noninverting input end of the first amplifier U1 to obtain the third voltage V3. In order to better distinguish the magnitude of the third voltages V3 obtained at different times (that is, to distinguish different third voltages obtained by different inputs), the third voltage V3 at this time is denoted as a fourth third voltage V34. The fourth third voltage V34 is proportional to the first voltage V1.

Up to time t12, it is switched to input the calibration voltage Vx to the noninverting input end of the first amplifier U1. Next, during the time period from time t12 to time t14, the calibration voltage Vx and the third voltage (which is denoted as a fifth third voltage V3x herein) are read respectively at preset time intervals. The preset time interval may be set depending on actual applications, and no specific limitation is made thereto by the embodiments of the present application. Then, the correspondence relationship between the calibration voltage Vx and the fifth third voltage V3x at the at least one moment can be determined.

For example, in some embodiments, the preset time interval is set to be half of the time period from time t12 to time t14. In this case, during the time period from time t12 to time t14, the correspondence relationship between the first set of calibration voltages Vx and the fifth third voltage V3x can be obtained at time t12, the correspondence relationship between the second set of calibration voltages Vx and the fifth third voltage V3x can be obtained at time t13 (which is at the middle of the time period from time t12 to time t14), and the correspondence relationship between the third set of calibration voltages Vx and the fifth third voltage V3x can be obtained at time t14 respectively.

Up to time t3, it is switched again to input the first voltage V1 to the noninverting input end of the first amplifier U1. The above process is repeated constantly in the above manner.

Meanwhile, in this embodiment, the correspondence relationship between the calibration voltage Vx and the fifth third voltage V3x at the at least one moment is obtained, and thus when it is switched again to input the first voltage V1 to the noninverting input end of the first amplifier U1, the first voltage V1 can be determined in real time based on the fourth third voltage V34 obtained and in combination with the correspondence relationship between the calibration voltage Vx and the fifth third voltage V3x at the at least one moment. In some embodiments, the correspondence relationship between the calibration voltage Vx and the fifth third voltage V3x at least one moment may be tabulated, and thus the first voltage V1 can be determined in real time by looking up the table after the fourth third voltage V34 is obtained. In some other embodiments, the first voltage V1 can also be determined by referring to the steps 42 and 43 shown in FIG. 4, and the specific implementation process shall be readily appreciated by those skilled in the art, and thus will not be further described herein.

Figure 9:
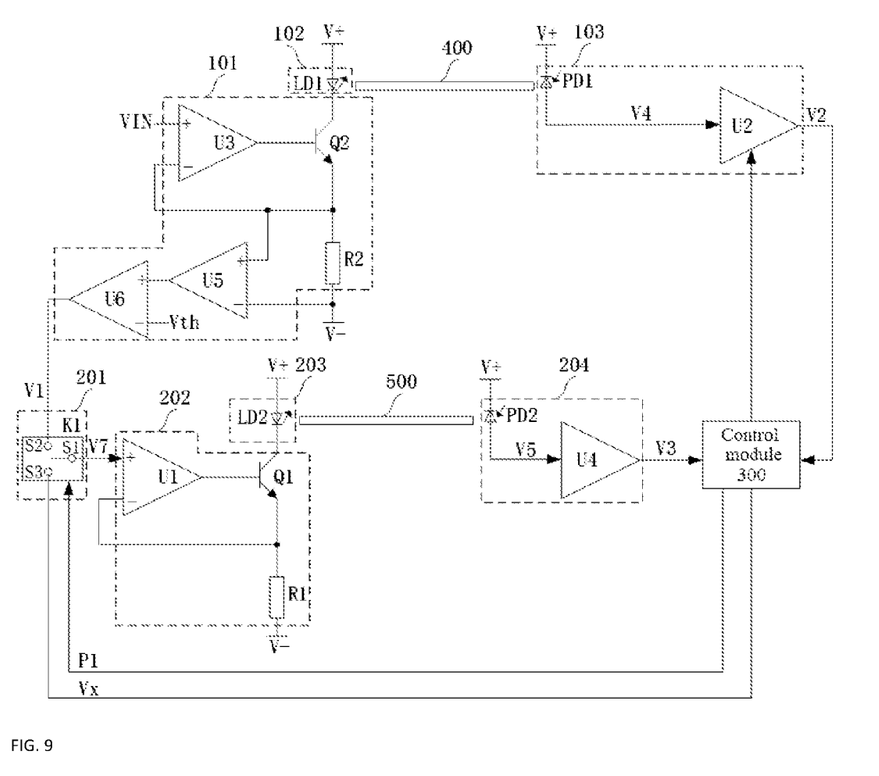
FIG. 9 is a schematic view illustrating the circuit structure of the signal transmission system according to the second embodiment of the present application.

Referring to FIG. 9, there is exemplarily shown a circuit structure of the first laser signal transmission system 100.

In an embodiment, as shown in FIG. 9, the electric signal generation module 101 includes a third amplifier U3, a second power triode Q2, a second resistor R2, a first subtracter U5 and a second subtracter U6.

A first input end of the third amplifier U3 is connected with the input voltage VIN, a second input end of the third amplifier U3 is connected with an emitter of the second power triode Q2, a first end of the second resistor R2 and a first input end of the first subtracter U5, an output end of the third amplifier U3 is connected with a base of the second power triode Q2, a collector of the second power triode Q2 is connected with the first end of the first electro-optical conversion module 102, the second end of the first electro-optical conversion module 102 is connected with the positive power supply V+, a second end of the second resistor R2 is connected with the negative voltage source V− and a second input end of the first subtracter U5, an output end of the first subtracter U5 is connected with a first input end of the second subtracter U6, a second input end of the second subtracter U6 inputs the reference voltage Vth, and an output end of the second subtracter U6 outputs the first voltage V1. The reference voltage Vth is obtained through multiplying the first threshold current Ith1 by the resistance of the second resistor R2. The first input end of the first amplifier U1 is a noninverting input end and the second input end of the first amplifier U1 is an inverting input end, that is, Vth=Ith*R1. The first input end of the first subtracter U5 (and the second subtracter U6) is the noninverting input end and the second input end of the first subtracter U5 (and the second subtracter U6) is the inverting input end.

Specifically, the third amplifier U3 is configured to amplify the input voltage VIN and then input the input voltage VIN amplified to the second power triode Q2, so that the second power triode Q2 is turned on to generate the first current ILD1.

In an embodiment, the first electro-optical conversion module 102 includes a first laser diode LD1.

A first end of the first laser diode LD1 is connected to the positive power supply V+, and a second end of the first laser diode is connected to the electric signal generation module 101.

Specifically, the first laser diode LD1 is a semiconductor laser, which is also called a Laser Diode (LD). The second laser diode LD1 uses semiconductor materials to generate and amplify laser beams. The working principle of the second laser diode LD1 is to inject current into the semiconductor material to generate stimulated radiation and amplify it into laser (i.e. output the first optical signal).

In an embodiment, the first optical-electro conversion module 102 includes a first photodiode LD1 and a second amplifier U2. The second amplifier U2 is connected to the first photodiode LD1. A first end of the first photodiode PD1 is connected to the positive power supply V+, and an input end of the second amplifier U2 is connected to a second end of the first photodiode PD1.

Specifically, the first photodiode LD1 is configured to receive the first optical signal from the first analog optical fiber 400 and convert the first optical signal into a fourth voltage V4. The second amplifier U2 is configured to amplify the fourth voltage V4 and output the second voltage V2. The control module 300 is further configured to adjust the amplification factor of the second amplifier U2 based on the first ratio of the first voltage V1 to the second voltage V2.

Next, the principle of the first laser signal transmission system shown in FIG. 9 will be explained again.

When the input voltage VIN is input to the laser signal transmission system 100, the signal output by the third amplifier U3 turns on the second power triode Q2 to generate a second current ILD2. The second current ILD2 flows through the first laser diode LD1 and the second resistor R2. The first laser diode LD1 outputs the first optical signal. Next, the first optical signal is transmitted through the first analog optical fiber 400. The first photodiode PD1 receives the first optical signal from the first analog optical fiber 400 and outputs the fourth voltage V4 corresponding to the first optical signal. The fourth voltage V4 is input to the second amplifier U2. The second amplifier U2 amplifies the fourth voltage V4 and outputs the second voltage V2 to the control module 300. At this time, formula (1) can be obtained from the above analysis of the second laser signal transmission system 200, and the following formula can be obtained in the same manner: the second voltage V2=K1 (ILD1-Ith1) (7). K1 is the first electro-optical conversion coefficient of the first electro-optical conversion module 102.

Meanwhile, the first current ILD1 flows through the second resistor R2 to generate a voltage ILD1*R2 on the second resistor R2. The signal output by the output end of the first subtracter U5 is the difference between the voltages input by the noninverting input end and the inverting input end of the first subtracter U5, i.e., the voltage ILD1*R2 across the second resistor R2. The voltage ILD1*R2 is input to the second subtracter U6. The output of the second subtracter U6 is ILD1*R1-Vth. Because Vth=Ith1*R2, ILD1*R2-Vth=ILD1*R2-Ith1*R2=R2*(ILD1-Ith1). The output end of the second subtracter U4 output the first voltage V1, and the following formula can be obtained according to the above description: V1=R2*(ILD1-Ith1) (8).

Then, the following formula can be obtained in combination with formulas (7) and (8): $V1/V2=R2/K1$ (9). Therefore, when the resistance of the second resistor R2 has been determined, there is a correspondence relationship between $V1/V2$ and K. Based on the above description, when the first electro-optical conversion coefficient K1 changes due to temperature drift, the control module 300 can determine the change of the first electro-optical conversion coefficient K1 by the ratio of the first voltage V1 to the second voltage V2, and then adjust the amplification factor of the second amplifier U2 accordingly, so that the change of the first electro-optical conversion coefficient K1 can be compensated, thereby improving the transmission accuracy.

Further speaking, based on the formula (9), the ratio of the first voltage V1 to the second voltage V2 when the first electro-optical conversion coefficient K is not affected by temperature drift can also be determined in the embodiment of the present application. The ratio is taken as the reference ratio, and the ratio of the first voltage V1 to the second voltage V2 is obtained in real time during the transmission of the laser signal by the first laser signal transmission system, and then compared with the reference ratio. In this way, the change of the first electro-optical conversion coefficient K1 can be determined simply according to the comparison result, and then the amplification factor of the second amplifier U2 can be adjusted accordingly.

In an embodiment, the resistance of the second resistor R2 may be configured to be equal to the reference electro-optical conversion coefficient of the first electro-optical conversion module 102. The reference electro-optical conversion coefficient of the first electro-optical conversion module 102 is the electro-optical conversion coefficient when the first laser diode LD1 is not affected by temperature drift. At this time, the control module 300 is further configured to perform the following steps of the method: determining the first reference ratio of the first voltage to the second voltage as 1; keeping the amplification factor of the signal amplification module unchanged if the first reference ratio is equal to the first ratio; decreasing the amplification factor of the signal amplification module if the first reference ratio is greater than the first ratio; and increasing the amplification factor of the signal amplification module if the first reference ratio is less than the first ratio.

The first reference ratio is the reference ratio of the first voltage V1 to the second voltage V2.

Specifically, when the first reference ratio is equal to the first ratio obtained in real time, it means that no temperature drift occurs to the electro-optical conversion coefficient of the first laser diode LD1, and there is no need to adjust the amplification factor (that is, gain) of the second amplifier U2 at this time.

When the first reference ratio is less than the first ratio, it means that the electro-optical conversion coefficient of the first laser diode LD1 is decreased due to temperature drift, and the amplification factor of the second amplifier U2 needs to be increased at this time. Then, the second voltage V2 increases, and as can be determined according to the formula (7) in the above embodiment, the actual electro-optical conversion coefficient of the first laser diode LD1 also increases. The amplification factor of the second amplifier U2 is stopped from being increased until the first reference ratio is equal to the first ratio.

When the first reference ratio is greater than the first ratio, it means that the electro-optical conversion coefficient of the first laser diode LD1 is increased due to temperature drift, and the amplification factor of the second amplifier U2 needs to be decreased at this point. Then, the second voltage V2 decreases, and as can be determined according to the formula (7) in the above embodiment, the actual electro-optical conversion coefficient of the laser diode LD1 also decreases. The amplification factor of the second amplifier U2 is stopped from being decreased until the first reference ratio is equal to the first ratio.

As shall be appreciated, in this embodiment, the first reference ratio is 1, and thus finally the first voltage V1 can be completely equal to the second voltage V2 by adjusting the amplification factor of the second amplifier U2 in the above manner. As a result, influence on the accuracy in case the first voltage V1 and the second voltage V2 are non-constant voltages can be avoided. In other words, this method features higher accuracy.

In addition, the waveform shapes and frequency spectrums of the first voltage V1 and the second voltage V2 depend on the input voltage VIN, and thus the waveform shapes and frequency spectrums of the first voltage V1 and the second voltage V2 may be very complicated. The methods often adopted in the related art, such as measuring the average value, the effective value and the low-frequency waveform of these two voltages, have low accuracy. However, in the embodiment of the present application, the waveforms of the first voltage V1 and the second voltage V2 are compared synchronously in real-time, so accurate comparison accuracy can be achieved no matter how the waveform shapes and frequency spectrums of the first voltage V1 and the second voltage V2 change.

The embodiment of the present application further provides another method for adjusting the amplification factor of the second amplifier U2. Specifically, the control module 300 is further configured to execute the following steps of the method: determining a reference electro-optical conversion coefficient of the electro-optical conversion module; determining a second reference ratio of the first voltage to the second voltage based on the reference electro-optical conversion coefficient; keeping the amplification factor of the signal amplification module unchanged if the second reference ratio is equal to the first ratio; decreasing the amplification factor of the signal amplification module if the second reference ratio is greater than the first ratio; and increasing the amplification factor of the signal amplification module if the second reference ratio is less than the first ratio.

The second reference ratio is the reference ratio of the first voltage V1 to the second voltage V2.

The reference electro-optical conversion coefficient of the electro-optical conversion module 102 may be determined by the formula (8) when no temperature drift occurs to the first electro-optical conversion module 20, or it may be obtained by other means, and no specific limitation is made thereto in the embodiment of the present application.

Specifically, the second reference ratio can be obtained by substituting the reference electro-optical conversion coefficient into the formula (9) in the above embodiment.

When the second reference ratio is equal to the first ratio obtained in real time, it means that no temperature drift occurs to the electro-optical conversion coefficient of the first laser diode LD1, and there is no need to adjust the amplification factor (i.e., the gain) of the second amplifier U2.

When the second reference ratio is less than the first ratio, it means that the electro-optical conversion coefficient of the first laser diode LD1 is decreased due to temperature drift, and the amplification factor of the second amplifier U2 needs to be increased at this time. Then, the second voltage V2 increases, and as can be determined according to the formula (7) in the above embodiment, the actual electro-optical conversion coefficient of the first laser diode LD1 also increases. The amplification factor of the second amplifier U2 is stopped from being increased until the second reference ratio is equal to the first ratio.

When the second reference ratio is greater than the first ratio, it means that the electro-optical conversion coefficient of the first laser diode LD1 is increased due to temperature drift, and the amplification factor of the second amplifier U2 needs to be decreased at this point. Then, the second voltage V2 decreases, and as can be determined according to the formula (7) in the above embodiment, the actual electro-optical conversion coefficient of the laser diode LD1 also decreases. The amplification factor of the second amplifier U2 is stopped from being decreased until the second reference ratio is equal to the first ratio.

In addition, it shall be noted that, the hardware structure of the signal transmission system shown in FIG. 9 is only an example, and the signal transmission system may have more or fewer components than those shown in the figures, or the signal transmission system may combine two or more components or have different component configurations, and various components shown in the figures may be implemented in hardware, software, or combinations of hardware and software including one or more signal processing and/or application specific integrated circuits.

For example, since the input and output of the control module 300 are digital signals, a corresponding analog-to-digital conversion module or a digital-to-analog conversion module may be further provided between the control module 300 and other modules (such as the fourth amplifier U4).

Figure 10:
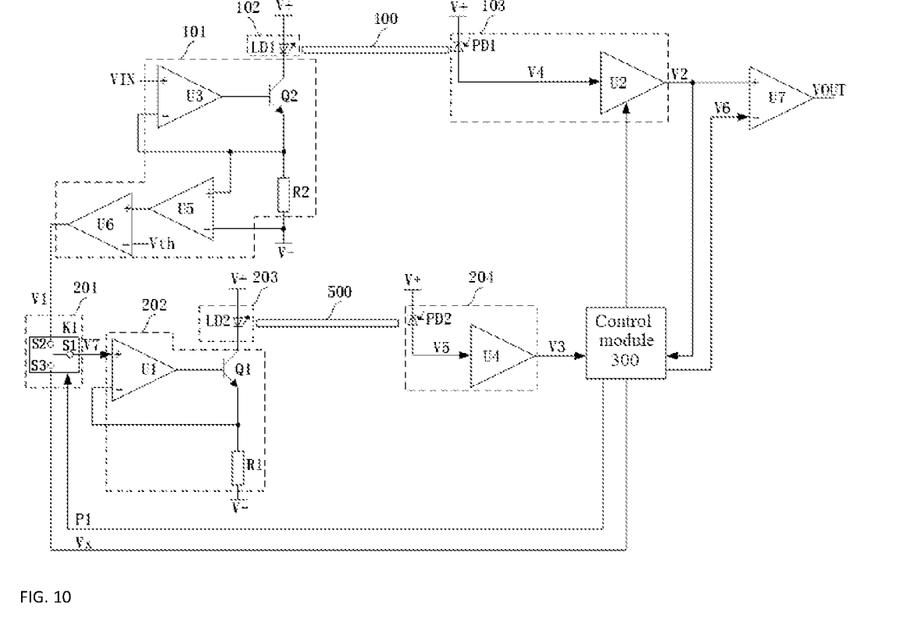
FIG. 10 is a schematic view illustrating the circuit structure of a signal transmission system according to a third embodiment of the present application.

As another example, as shown in FIG. 10, the signal transmission system further includes a subtracter U7. The subtracter U7 is connected to the first optical-electro conversion module 103 and the control module 300 respectively.

Specifically, the control module 300 is further configured to obtain a first static working current Is1 of the first electro-optical conversion module 103 and output a sixth voltage V6 corresponding to the first static working current Is1 to the subtracter U7. When the input voltage is 0, the current flowing through the first electro-optical conversion module is the first static working current Is1. The subtracter U7 is configured to generate an output voltage VOUT based on the difference between the second voltage V2 and the sixth voltage V6.

In this embodiment, based on the imaginary short circuit and imaginary open circuit characteristics of the third amplifier U3, the voltages at two input ends of the third amplifier U3 will eventually be equal. Therefore, the input voltage VIN is equal to the voltage at the first end of the second resistor R2. The voltage at the second end of the second resistor R2 is the voltage provided by the negative power supply V−. Then, the first current $ILD1=(VIN-V-)/R2$.

Figure 11:
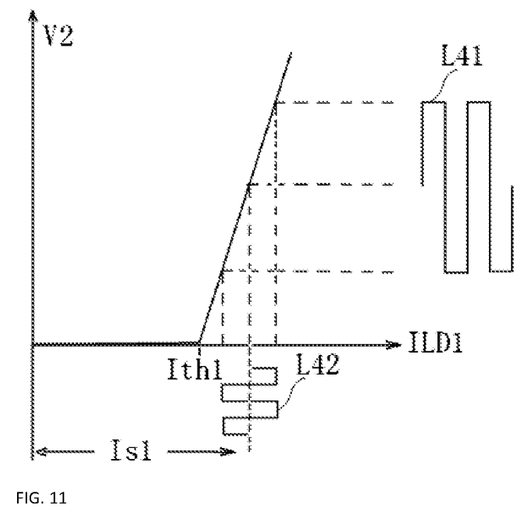
FIG. 11 is a schematic view of the first current and the second voltage according to the first embodiment of the present application.

When the input voltage VIN is 0, the first current $ILD1=-V-/R2$. The first current ILD1 at this time is denoted as the first static working current Is1 of the first electro-optical conversion module 102. Referring to FIG. 11, there is exemplarily shown the first static working current Is1. By setting the first static working current Is for the first electro-optical conversion module 102, the working current of the first electro-optical conversion module 102 can fluctuate up and down in a linear interval near the first static working current Is1 when the input voltage VIN is input to the first laser signal transmission system 100, so that the second voltage V2 also changes linearly. As a result, no signal distortion occurs to the second voltage V2.

Then, the subtracter U7 generates the output voltage VOUT based on the difference between the second voltage V2 and the sixth voltage V6. Because the second voltage V2 also contains therein the DC voltage signal (that is, the sixth voltage V6) corresponding to the first static working current Is1 of the first laser diode LD1, the output voltage VOUT in direct proportion to the input voltage VIN can be obtained by setting the subtracter U3 to subtract the sixth voltage V6 corresponding to the first static working current Is1.

Finally it shall be noted that, the above embodiments are only used to describe but not to limit the technical solutions of this application; and within the spirits of this application, technical features of the above embodiments or different embodiments may also be combined with each other, the steps may be implemented in an arbitrary order, and many other variations in different aspects of this application described above are possible although, for purpose of simplicity, they are not provided in the details. Although this application has been detailed with reference to the above embodiments, those of ordinary skill in the art shall appreciate that modifications can still be made to the technical solutions disclosed in the above embodiments or equivalent substations may be made to some or all of the technical features, and the corresponding technical solutions will not essentially depart from the scope of the embodiments of this application due to such modifications or substations.

The invention claimed is:

1. A signal transmission system, comprising:
a first laser signal transmission system, a second laser signal transmission system and a control module;
the first laser signal transmission system comprising an electric signal generation module, a first electro-optical conversion module and a first optical-electro conversion module;
the electric signal generation module being connected with the first electro-optical conversion module and an input voltage respectively, and being configured to output a first current based on the input voltage and output a first voltage which is in direct proportion to the difference between the first current and a first threshold current of the first electro-optical conversion module, wherein when the current flowing through the first electro-optical conversion module is less than the first threshold current, the first electro-optical conversion module stops working;
the first electro-optical conversion module being configured to output a first optical signal corresponding to the first current, wherein the first optical signal is transmitted through a first analog optical fiber;
the first optical-electro conversion module being connected with the control module, and being configured to receive the first optical signal from the first analog optical fiber and output a second voltage to the control module based on the first optical signal;
the second laser signal transmission system being connected with the control module and alternately inputting the first voltage and a preset calibration voltage, wherein the second laser signal transmission system is configured to output a third voltage proportional to the voltage input by the second laser signal transmission system to the control module;
the control module being configured to determine the first voltage based on the correspondence relationship between the calibration voltage and the third voltage and based on the third voltage, and determine a first electro-optical conversion coefficient of the first electro-optical conversion module based on a ratio of the first voltage to the second voltage;

the second laser signal transmission system comprising a switch module, a voltage-current conversion module, a second electro-optical conversion module and a second optical-electro conversion module;

the control module further being configured to output the calibration voltage and output a pulse signal;

the switch module being respectively connected with the electric signal generation module, the control module and the voltage-current conversion module, and being configured to receive the pulse signal, establish a connection between the electric signal generation module and the voltage-current conversion module when the pulse signal is at a first level so as to input the first voltage to the voltage-current conversion module, and establish a connection between the control module and the voltage-current conversion module when the pulse signal is at a second level so as to input the calibration voltage to the voltage-current conversion module;

the voltage-current conversion module being configured to output a second current based on the first voltage or the calibration voltage;

the second electro-optical conversion module being connected with the voltage-current conversion module, an being configured to output a second optical signal corresponding to the second current, wherein the second optical signal is transmitted through a second analog optical fiber;

the second optical-electro conversion module being connected with the control module, and being configured to receive the second optical signal from the second analog optical fiber and output the third voltage based on the second optical signal;

the voltage-current conversion module comprising a first amplifier, a first power triode and a first resistor;

a first input end of the first amplifier being connected with the switch module, a second input end of the first amplifier being respectively connected with a first end of the first resistor and an emitter of the first power triode, a collector of the first power triode being connected with the second electro-optical conversion module, an output end of the first amplifier being connected with a base of the first power triode, and a second end of the first resistor being connected with a negative power supply;

the control module further being configured to:

configure the calibration voltage as a multilevel voltage signal, wherein the multilevel voltage signal is a voltage signal including at least two levels;

when the calibration voltage is input to the first amplifier, respectively substitute the voltage corresponding to each level in the multilevel voltage signal into a first formula to determine a second electro-optical conversion coefficient and a second threshold current of the second electro-optical conversion module, wherein the first formula is $V3=K2(V4-V-)/R1-K2*Ith2$, V3 is the third voltage, K2 is the second electro-optical conversion coefficient, V4 is a voltage input by the first input end of the first amplifier, V− is the voltage of the negative power supply, R1 is the resistance of the first resistor, Ith2 is the second threshold current of the second electro-optical conversion module, and when the current flowing through the second electro-optical conversion module is less than the second threshold current, the second electro-optical conversion module stops working; and when the first voltage is input to the first amplifier, substitute the third voltage, the second electro-optical conversion coefficient and the second threshold current into the first formula to determine the first voltage.

2. The signal transmission system according to claim 1, wherein the first optical-electro conversion module comprises a first photodiode and a second amplifier;

the first photodiode is configured to receive the first optical signal from the first analog optical fiber and convert the first optical signal into a fourth voltage;

the second amplifier is connected with the first photodiode, and is configured to amplify the fourth voltage and output the second voltage; and the control module is further configured to adjust a amplification factor of the second amplifier based on a first ratio of the first voltage to the second voltage.

3. The signal transmission system according to claim 2, wherein the electric signal generation module comprises a third amplifier, a second power triode, a second resistor, a first subtracter and a second subtracter;

a first input end of the third amplifier is connected with the input voltage, a second input end of the third amplifier is connected with an emitter of the second power triode, a first end of the second resistor and a first input end of the first subtracter, an output end of the third amplifier is connected with a base of the second power triode, a collector of the second power triode is connected with a first end of the first electro-optical conversion module, a second end of the first electro-optical conversion module is connected with a positive voltage source, a second end of the second resistor is connected with a negative voltage source and a second input end of the first subtracter respectively, an output end of the first subtracter is connected with a first input end of the second subtracter, a second input end of the second subtracter inputs a reference voltage, and an output end of the second subtracter outputs the first voltage, wherein the reference voltage is obtained through multiplying the first threshold current by the resistance of the second resistor; and the third amplifier is configured to amplify the input voltage and then input the input voltage amplified to the second power triode so that the second power triode is turned on to generate the first current.

4. The signal transmission system according to claim 3, wherein the resistance of the second resistor is set to be equal to a reference electro-optical conversion coefficient of the first electro-optical conversion module;

the control module is further configured to:

determine a first reference ratio of the first voltage to the second voltage to be 1;

keep the amplification factor of the second amplifier unchanged if the first reference ratio is equal to the first ratio;

decrease the amplification factor of the second amplifier if the first reference ratio is greater than the first ratio; and increase the amplification factor of the second amplifier if the first reference ratio is smaller than the first ratio.

5. The signal transmission system according to claim 1, wherein the first optical-electro conversion module comprises a first laser diode, and the second optical-electro conversion module comprises a second laser diode;

a first end of the first laser diode is connected with a positive power supply, a second end of the first laser diode is connected with the electric signal generation module;

a first end of the second laser diode is connected with the positive power supply, and a second end of the second laser diode is connected with the voltage-current conversion module.

6. The signal transmission system according to claim 1, wherein the second optical-electro conversion module comprises a second photodiode and a fourth amplifier;

the second photodiode is configured to receive the second optical signal from the second analog optical fiber and convert the second optical signal into a fifth voltage;

an input end of the fourth amplifier is connected with the second photodiode, an output end of the fourth amplifier is connected with the control module, and the fourth amplifier is configured to amplify the fifth voltage and output the third voltage.

7. The signal transmission system according to claim 1, wherein the signal transmission system further comprises a subtracter which is respectively connected with the first optical-electro conversion module and the control module;

the control module is further configured to acquire a first static working current of the first electro-optical conversion module and output a sixth voltage corresponding to the first static working current to the subtracter, wherein the current flowing through the first electro-optical conversion module when the input voltage is 0, is the first static working current; and the subtracter is configured to generate an output voltage based on the difference between the second voltage and the sixth voltage.

* * * * *